(12) United States Patent
Sandolo

(10) Patent No.: US 7,143,686 B1
(45) Date of Patent: Dec. 5, 2006

(54) COFFEE ROASTING APPARATUS AND METHOD

(76) Inventor: Raffael Sandolo, 226 Thayer Pond Rd., Wilton, CT (US) 06897

( * ) Notice: Subject to any disclaimer, the term of this patent is extended or adjusted under 35 U.S.C. 154(b) by 327 days.

(21) Appl. No.: 10/613,696

(22) Filed: Jul. 3, 2003

Related U.S. Application Data

(63) Continuation of application No. 09/847,255, filed on May 2, 2001, now abandoned.

(51) Int. Cl.
*A23N 12/10* (2006.01)

(52) U.S. Cl. .............................. 99/286; 99/469; 99/470; 99/475; 99/476; 99/479; 99/480; 99/483; 34/79; 34/108; 34/131

(58) Field of Classification Search .................. 99/286, 99/469, 470, 472, 479, 480, 483; 34/72, 34/79, 108, 131
See application file for complete search history.

(56) References Cited

U.S. PATENT DOCUMENTS

| 1,843,131 A | 2/1932 | Howson |
| 2,762,289 A | 9/1956 | Crutcher et al. |
| 3,841,826 A | 10/1974 | Angstadt et al. |
| 4,642,906 A | 2/1987 | Kaatze et al. |
| 5,709,542 A | 1/1998 | Rentzel et al. |
| 5,928,697 A | 7/1999 | Argiles |
| 6,382,087 B1 | 5/2002 | Lilyama |

FOREIGN PATENT DOCUMENTS

| DE | 3711098 A1 | 10/1988 |
| DE | 3711098 A1 * | 10/1988 |

* cited by examiner

*Primary Examiner*—Drew Becker
(74) *Attorney, Agent, or Firm*—Fattibene & Fattibene; Arthur T. Fattibene; Paul A. Fattibene

(57) ABSTRACT

A coffee roaster that includes a combustion chamber and a connected roasting oven in which the heating gases for roasting the coffee beans are recirculated to the combustion chamber wherein the coffee bean chaff is separated from the recirculating heating gases prior to venting to atmosphere, and an associated cooling chamber wherein the roasted coffee beans are cooled in a two-stage-heating cycle wherein the cooling air is recirculated to the combustion chamber to be reheated to roasting temperatures and vented to atmosphere during the second stage of cooling. The coffee beans being de-stoned as the cooled coffee beans are conveyed from the cooling chamber to the discharge hopper.

6 Claims, 6 Drawing Sheets

COFFEE ROASTING APPARATUS AND METHOD

RELATED APPLICATION

This application is a continuation application of application Ser. No. 09/847,255 filed May 2, 2001 for Coffee Roasting Apparatus and Method, now abandoned.

FIELD OF THE INVENTION

This invention is directed to a coffee roasting apparatus and method of roasting coffee, and more specifically to an improvement in generating and recirculating the heating and cooling gases for effecting the coffee roasting process in a desirous environmental manner.

BACKGROUND OF THE INVENTION

Heretofore, coffee roasting was effected merely by passing heated combustion gases or air over the green coffee beans positioned in a rotating roasting drum or oven, wherein the heated gases passing through the roasting oven was exhausted to atmosphere together with coffee bean shells or chaff and/or other coffee residue. Such apparatus and methods released harmful impurities and odors into the atmosphere. Accordingly, many regulations have been put in effect in an effort to control or limit the amount of odors and impurities that coffee roasters are permitted to exhaust to atmosphere. As a result, the conventionally known methods and/or apparatuses in many instances cannot meet some of the more rigid standards currently being put into effect.

SUMMARY OF THE INVENTION

An object of this invention is directed to a method and apparatus for effecting the recirculation of the roasting or heating gases back to the combustion or heating chamber after removing therefrom the coffee shells or chaff that tend to co-mingle with the heating gases passing through the roasting chamber or oven.

Another object is to effect the recirculation of the cooling gases exhausting from a coffee cooling chamber back to the combustion chamber in a manner whereby the recirculating cooling gases maintain the outer surfaces of the combustion or heating chamber at a temperature lower than that of the gases generated in the combustion chamber and whereby the recirculated cooling gases are incrementally raised to roasting temperature.

Another object of this invention is to provide a two stage cooling cycle wherein the cooling gases are recirculated to the combustion chamber during the first cooling cycle to be reheated to roasting temperatures, and whereby the cooling gases are diverted during the second stage of the cooling cycle for venting to atmosphere.

The foregoing objects and other features and advantages are attained by a coffee roasting apparatus and method that includes a burner and an associated heating or combustion chamber for generating the roasting or heating gases. A coffee roasting oven is connected in communication with the combustion chamber by a conduit for directing the heating gases from the combustion chamber to the roasting oven for roasting the coffee beans deposited therein. Connected to the roasting oven is a hopper by which the coffee beans to be roasted are directed to the roasting oven. The roasting oven is provided with a gas outlet which is connected into communication with a fan for conveying the heating gases and any coffee chaff carried along therewith to a cyclone separator whereby the coffee chaffs are separated from the heating gases. The heating gases, from which the coffee chaff has been separated, is then recirculated to the combustion chamber and exhausted to atmosphere, free of any coffee chaff.

Upon completion of the roasting cycle, the roasted coffee beans in the roasting oven are transferred to a cooling chamber wherein the roasted beans are cooled in a two-phase cycle.

In the first phase of the cooling cycle, the cooling chamber is connected in communication with a fan which, when actuated, will draw atmospheric cooling air through the cooling chamber and recirculates the same to the combustion chamber where the cooling air is reheated to roasting temperature. In the second phase of the cooling cycle, the cooling chamber is connected into communication to a second fan which directs the cooling air through the cooling chamber and which is subsequently vented to atmosphere. During the second cooling phase, the cooling chamber is closed off from the first fan so that the cooling gases or air are exhausted to atmosphere free of any chaff and/or other impurities. As the coffee beans are cooled in the cooling chamber and conveyed by aspiration to a discharge hopper 36, the coffee beans are also being de-stoned whereby the separated stones are directed to a collection bin for disposal.

Subsequent to the cooling phase, the roasted coffee, free of any chaff and de-stoned, is aspirated or conveyed from the cooling chamber to a discharge hopper by the suction imparted thereto by the second fan and any residual gases being discharged to atmosphere in a more purified state so that the release of any coffee chaff and/or other impurities or odor to atmosphere is greatly diminished, if not eliminated.

IN THE DRAWINGS

DETAILED DESCRIPTION

Figure 1:
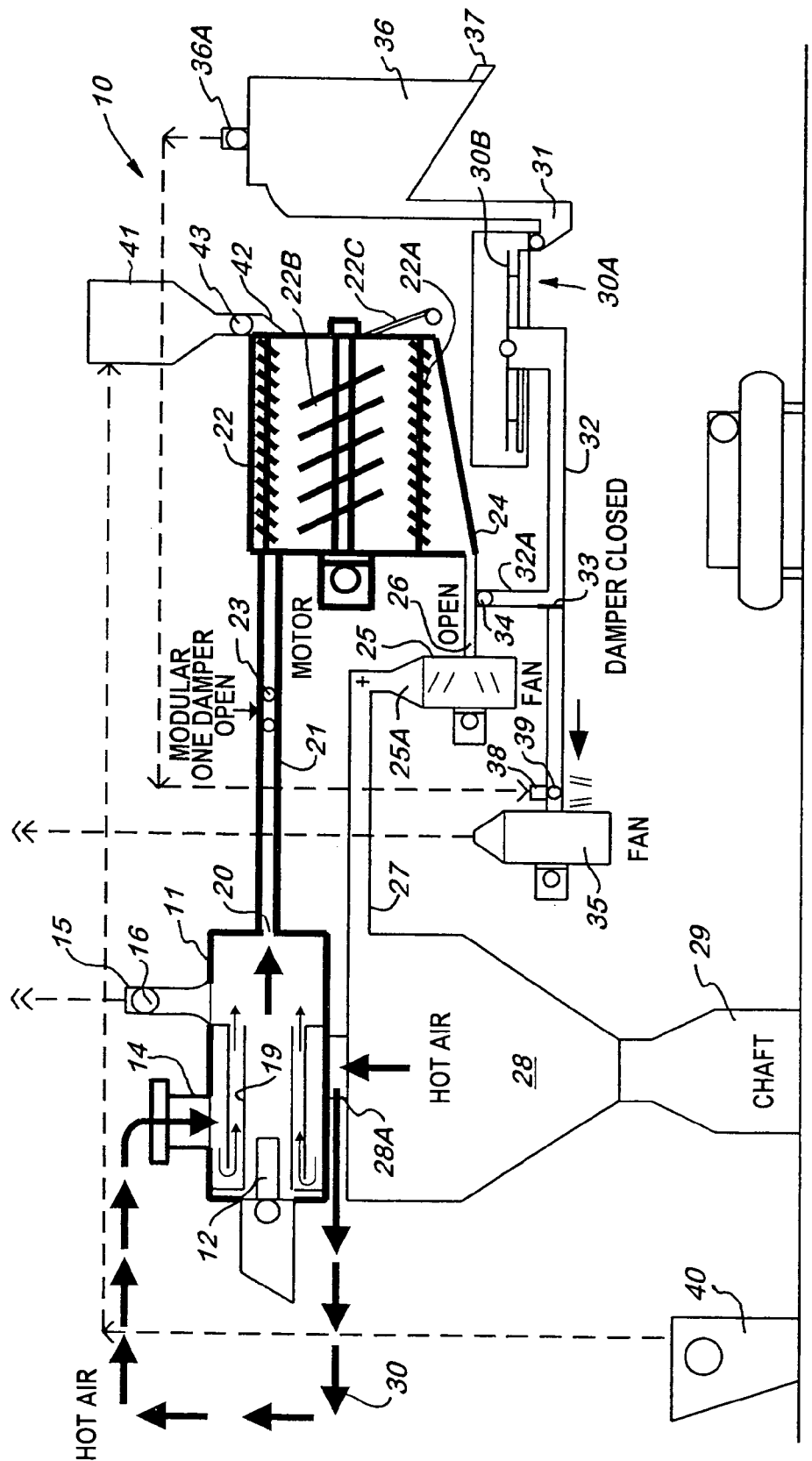
FIG. 1 is a diagrammatic side view of a coffee roasting apparatus embodying the present invention emphasizing the roasting phase.

Referring to the drawings, there is illustrated in diagrammatic form, a coffee roasting apparatus 10 embodying the present invention emphasizing the various steps of the roasting process. The coffee roasting apparatus 10 illustrated in FIGS. 1 to 5 includes a combustion chamber 11 which is fired by a suitable burner 12, e.g. a gas burner for generating the heating gases for effecting the roasting of green coffee beans.

Figure 6:
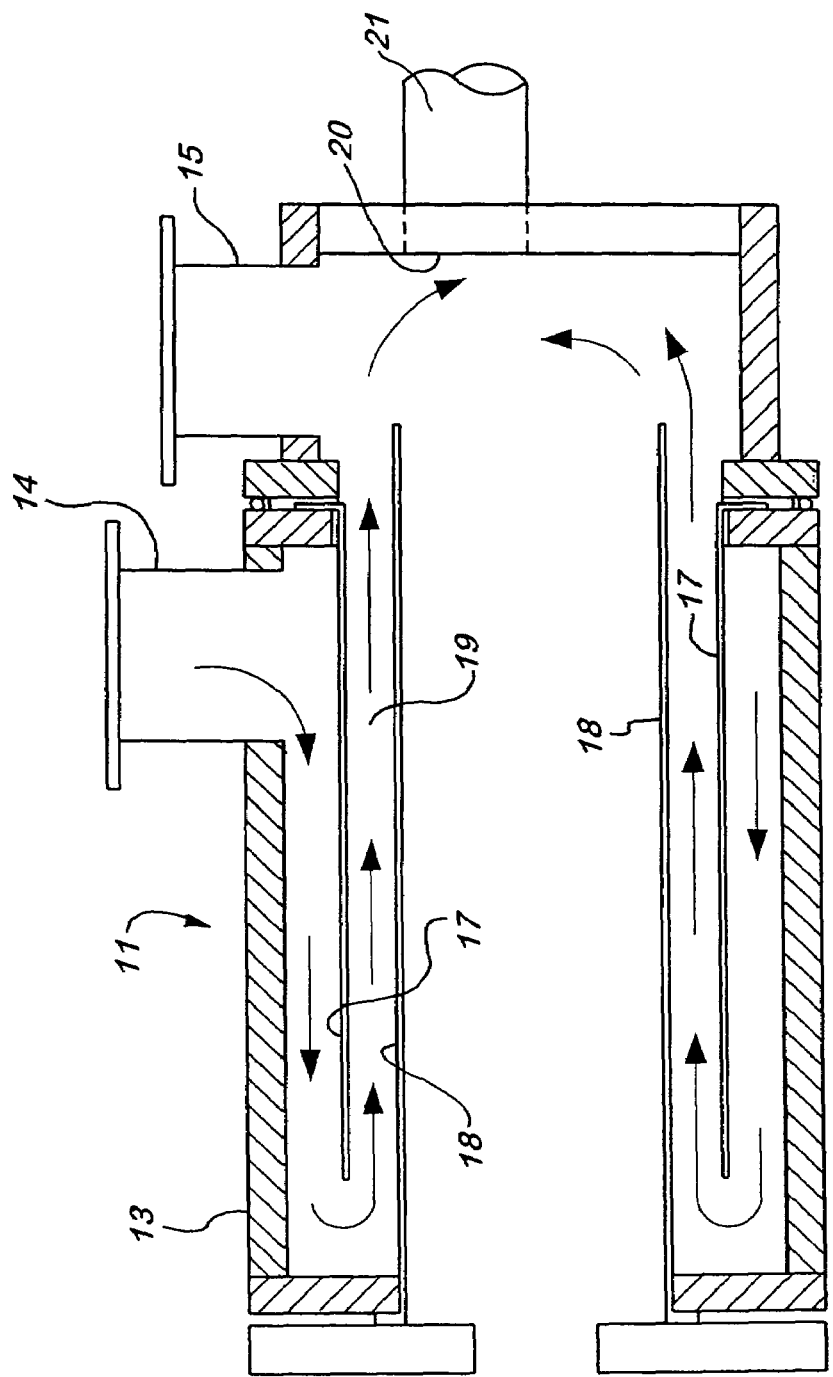
FIG. 6 is a detail side sectional view of the combustion chamber.

The combustion chamber 11, as best seen in FIG. 6, includes an outer insulated shell or housing 13 of any suitable cross-sectional shape which has a recirculating gas inlet 14 and a gas outlet 15 exhausting to atmosphere. A damper 16 controls the exhausting of the gases from outlet 15. Disposed within the shell or housing 13 of the combustion chamber 11 is a first and second baffle 17 and 18 respectively. The first and second baffles 17 and 18 are concentric, spaced apart, and having a cross-sectional configuration that is complementary to that of combustion chamber 11 to define a sinuous path or passageway 19 for the incoming recirculated heating or cooling gases as can be best seen in FIG. 6, and as will be hereinafter described. The outlet 20 of the combustion chamber 11 connects to a conduit 21 for directing the heating gases generated in the combustion chamber 11 to the roasting oven 22. See FIG. 1.

The roasting oven 22 is of a generally conventional type having a perforated rotating drum 22A and internal vanes 22B for tumbling the coffee beans as the heated gases from the combustion chamber 11 passes through the roasting oven. Modulating dampers 23 control the amount of heating gases allowed to pass through the roasting oven 22. The roasting oven 22 is provided with an inclined outlet or discharge 24 which connects to a first fan 25 by means of a conduit 26. Fan 25 is provided with an outlet 25A connected to a duct or conduit 27 for directing the heated gases and any coffee chaffs entrained therein to a cyclone separator 28 wherein the chaff is separated from the heating gases. The chaff, which is separated from the heating gases within the cyclone separator 28, will fall by gravity into a chaff chamber 29 from which the chaff may be removed.

The heated gases free of the coffee chaff is then directed to the outlet 28A of the cyclone separator 28 and recirculated back to the combustion chamber 11 as indicated by the arrow flow path 30. The heating gases free of the residue coffee chaff is then reintroduced into the combustion chamber 11 via the gas inlet 14 and vented through outlet 15 to atmosphere free of any coffee chaff.

Figure 2:
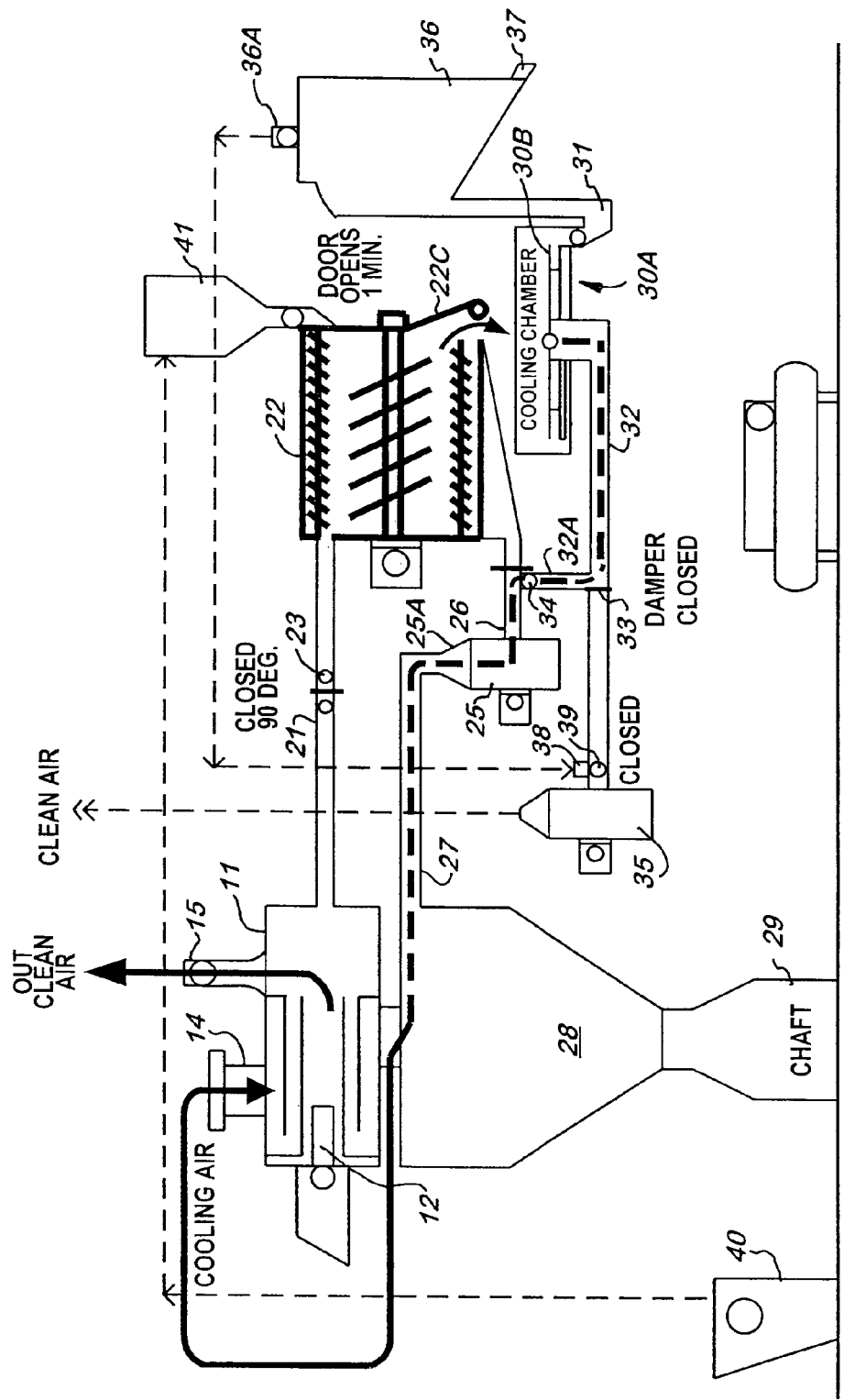
FIG. 2 is a view similar to FIG. 1 emphasizing the first step of the cooling phase.

Upon completion of the coffee roasting operation, the roasted coffee beans are removed from the roasting oven 22 via an oven outlet or door 22C, whereby the roasted beans are directed to a cooling chamber 30A located below the oven outlet 22C. Within the cooling chamber 30A, as shown in FIG. 2, is a rotating perforated platform 30B for receiving the roasted coffee beans. Invariably, small stones or pebbles tend to mix with the coffee beans when harvested, and which are required to be separated from the roasted coffee beans. This is effected as the cooled coffee beans are conveyed from the cooling chamber 30A to the discharge hopper 36 under a negative pressure, as will be described. Ultimately, the separated stones are directed to a de-stoning pit 31.

The cooling air entering the cooling chamber, upon the transfer of the roasted coffee beans from the roasting oven 22 to the cooling chamber 30A, is induced through conduit or passageway 32 and 32A by the suction imparted by fan 25. As best noted in FIG. 2, duct or conduit 32A connects with duct or conduit 26 which connects to the inlet of fan 25. Suitable dampers 33 and 34 are disposed at the junction of conduit 32 and 32A and at the junction of conduit 32A and 26 respectively, as noted in FIG. 2.

As best seen in FIG. 2, the dampers 33 and 34 are in a closed and open position respectively, so that the cooling air is directed from the cooling chamber 30A, through fan 25 and recirculated back to the combustion chamber 11 as indicated in FIG. 2. During the cooling cycle just described, the modulating dampers 23 in conduit 21 are closed so that the recirculated air is exhausted to atmosphere via outlet 15 as noted in FIG. 2, as clean air, i.e. free of any substantial coffee bean residue.

As noted in FIG. 2, the cooling medium, being recirculated to the combustion chamber 11, is directed in a sinuous path within the combustion chamber 11, as indicated at 19, whereby the recirculated cooling medium is incrementally reheated to roasting temperatures, with the cooler incoming recirculating cooling medium tempering the outer surfaces of the combustion chamber 11. As the recirculating cooling air advances through the sinuous path 19 and make contact with the surfaces of the innermost baffle 18, the temperatures of the recirculating air is incrementally raised to roasting temperatures whereby the heated air may be redirected to the roasting oven 22 to effect a subsequent roasting cycle or exhausted to atmosphere via the gas outlet or chimney 15, free of any residue or entrained chaff, the chaff being separated from the recirculating gases in the cyclone separator 28 and collected in the chaff chamber 29.

The cooling cycle described above, and as shown in FIG. 2, comprises the first phase of a two-phase cooling cycle, and which first phase has a relatively short duration, e.g. approximately one minute.

Figure 3:
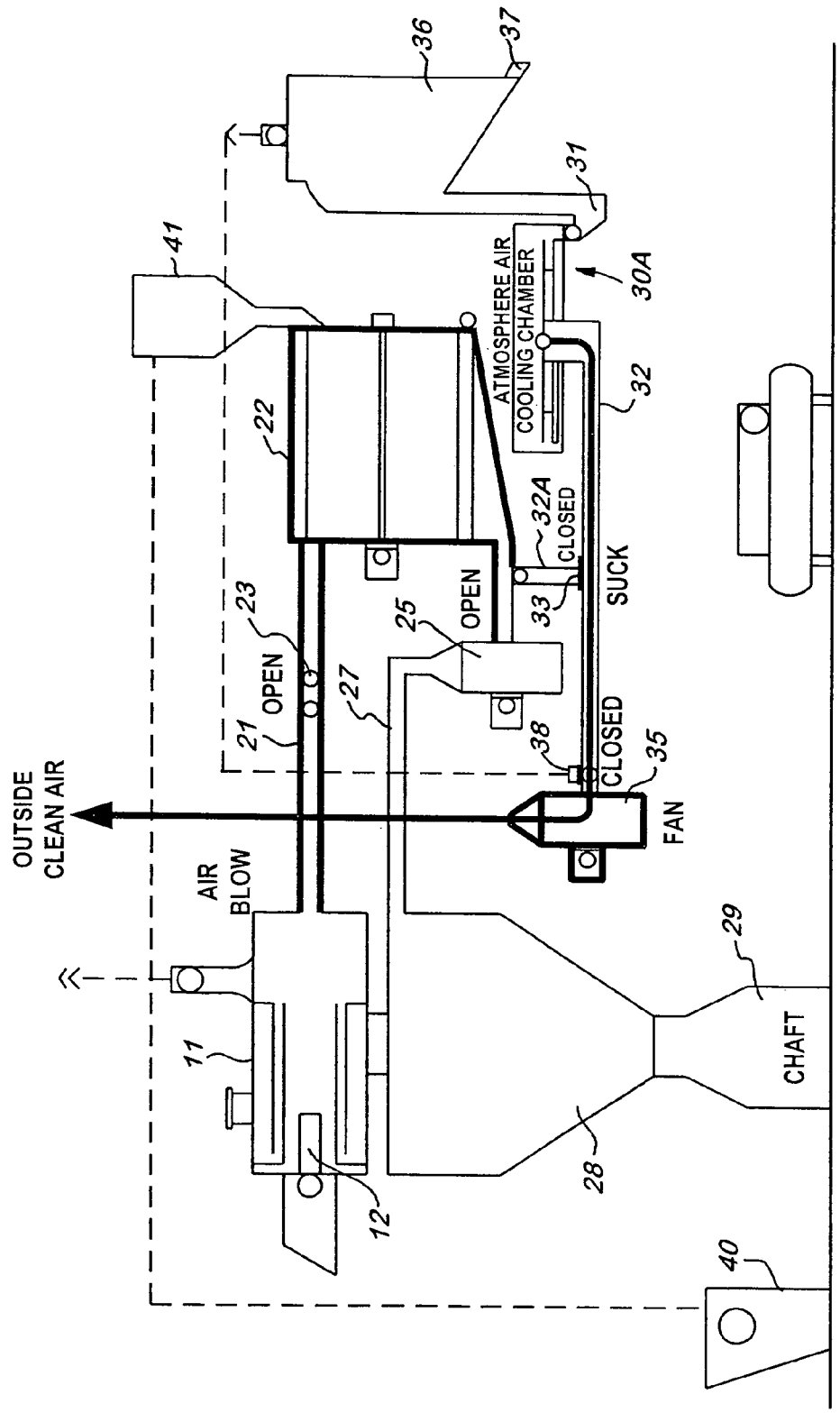
FIG. 3 is a view similar to FIG. 2 emphasizing the second step of the cooling phase.

FIG. 3 emphasizes the second stage of the cooling cycle. During this phase, damper 33 is shifted to a position wherein the damper 33 closes off conduit 32A from conduit 32 so that the cooling air exiting the cooling chamber 30A is directed via conduit 32 to a second fan 35, whereby the cooling medium is vented to atmosphere as clean air, as noted in FIG. 3. This second cooling phase may last 7 or 8 minutes.

Upon completion of the first and second cooling phases, the cooled coffee beans in the cooling chamber 30A, are de-stoned as the coffee beans are conveyed by aspiration from the cooling chamber 30A to a discharge hopper 36. The coffee beans, being lighter than the stones or pebbles, are aspirated upwardly to the hopper 36 as the heavier stones or pebbles are dropped into the de-stoning pit 31 from which they can be removed. The hopper 36 is provided with a controlled discharge opening 37 from which the roasted coffee beans may be removed and/or packaged.

Figure 4:
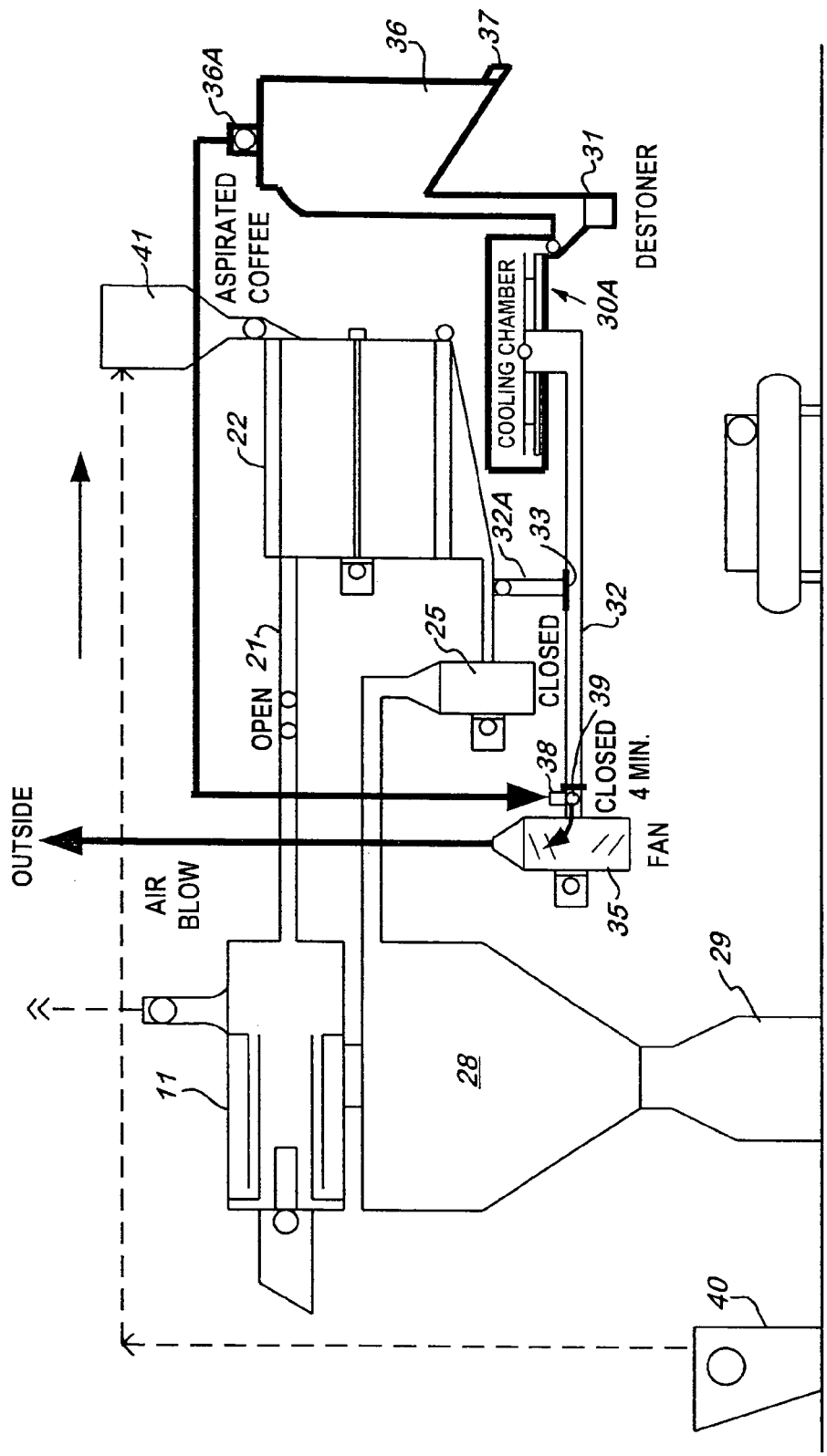
FIG. 4 is a view similar to FIGS. 1, 2 and 3 emphasizing the final phase of the roasting cycle.

Any residual gases entrained with the roasted coffee as the coffee beans are conveyed to the discharge hopper 36 by aspiration induced by fan 35 are vented or sucked out of the discharge hopper via outlet 36A and directed through suitable ducts (shown in dash lines) to an inlet 38 connected in communication with conduit 32 adjacent to the inlet of fan 35. A two-way control damper 39 is provided to close off the inlet 38 from conduit 32 so that a negative pressure is induced into the discharge hopper 36 whereby fan 35 is vented to atmosphere as best seen in FIG. 4.

During the second cooling phase herein described, the damper 39 is shifted to close off inlet 38 so that the cooling medium in the cooling chamber 30A is directed via conduit 32 to the inlet of fan 35 for venting to atmosphere as hereinbefore described. (See FIG. 3).

Figure 5:
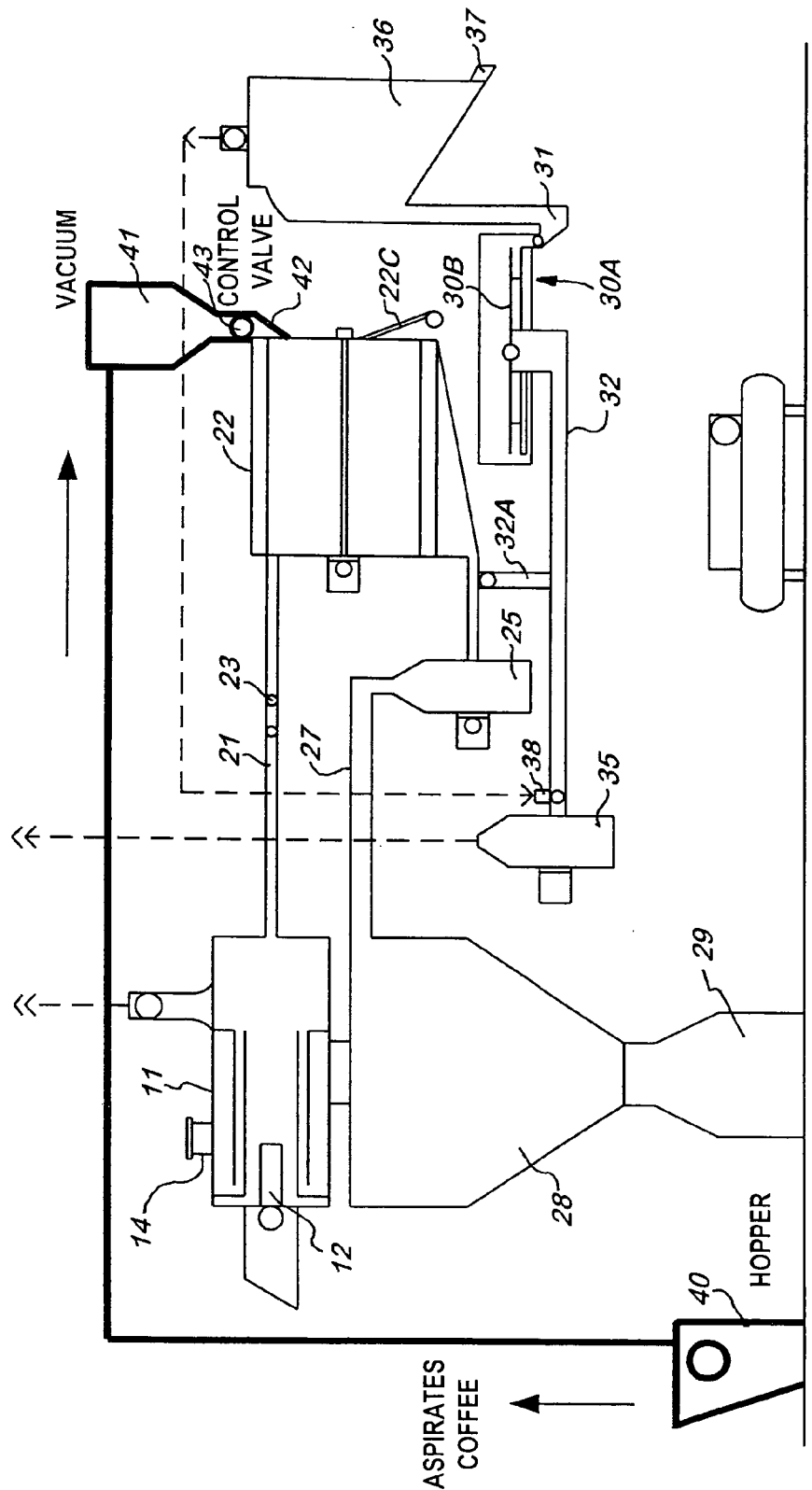
FIG. 5 is a view similar to FIGS. 1 to 4 emphasizing the step of loading the green coffee in the roasting oven.

FIG. 5 emphasizes the manner in which the green coffee beans are initially loaded into the roasting oven 22. This is attained by an operator dumping a load of green coffee beans into a loading hopper 40. From the loading hopper, the coffee beans are aspirated by a suction or negative pressure to second hopper 41 which has a controlled discharge port 42 disposed in communication with the roasting oven 22. A damper or valve 43 controls the opening and closing of the discharge port 42 so as to control the amount of green coffee beans to be placed into the roasting oven 22.

In operation, a predetermined amount of green coffee beans are loaded into the roasting oven 22, as hereinabove described. The roasting cycle is started as the burner 12 is actuated. As the combustion gases are generated, the gases are directed through conduit 21 to the roasting oven 22, the amount of heating or combustion gases directed to the roasting oven 22 being modulated by modulating damper 23. Within the roasting oven 22, the coffee beans are tumbled as they are being roasted whereby the coffee bean chaff or shell is separated from the coffee bean. The heating or combustion gases together with the coffee bean chaff exit the roasting oven 22 via oven discharge outlet 24 and are conveyed by conduit 26 to the inlet of fan 25 whereby the heating gases and entrained chaff are directed via conduit 27 to a cyclone separator 28.

Within the cyclone separator 28, the chaff is separated from the recirculating gases whereby the chaff drops to a chaff chamber 29 as the heating gases, free of any chaff, is directed to the inlet 14 for recirculating through the combustion chamber 11 or vented to atmosphere through inlet 15, free of any chaff. Generally, the roasting cycle may last for approximately fifteen minutes, but may vary depending upon the amount of coffee beans loaded into the roasting oven 22.

Upon completion of the roasting cycle, the roasted coffee beans are directed to a cooling chamber 30A whereby the roasted coffee beans are cooled in a two-phase cooling cycle. Upon the roasted coffee beans being cooled, the coffee beans are de-stoned, i.e. that any stones or pebbles that are co-mingled with the coffee beans during the harvesting thereof are separated from the roasted coffee beans as hereinbefore described. The separated stones or pebbles are directed to a de-stoning pit 31.

During the first phase of the cooling cycle, the cooling air under the action of fan 25 is sucked into the cooling chamber and directed through conduits 32 and 32A to the inlet of fan 25 and recirculated back to the combustion chamber 11, as best seen in FIG. 2. A damper or control valve 33 is positioned at the junction between conduit 32 and conduit 32A for directing the cooling air flow through fan 25 to the combustion chamber 11, as shown in FIG. 2. During the first cooling phase, the cooling air is recirculated to the combustion chamber 11 and exhausted to atmosphere through chimney or outlet 15 as clean gases. Generally, the first cooling phase may have a duration of approximately one minute, but may vary.

During the second cooling phase, damper 33 is shifted to a position whereby conduit 32A is shut off from communication with conduit 32 and control valve or damper 39 positioned to seal off inlet 38 so that the cooling air passing through the cooling chamber 30A is directed through fan 35 for venting to atmosphere, devoid of any entrained residue chaff, pebbles and the like. The second cooling phase may extend for approximately seven minutes, depending upon the amount of roasted coffee beans being cooled within the cooling chamber 30. See FIG. 3.

The final cycle comprises the conveyance of the roasted coffee beans, which have been cooled, from the cooling chamber to the discharge hopper 36. This is attained by aspiration or a negative pressure imposed on the discharge hopper 36. This is attained by fan 35 through inlet 38 disposed in communication with the discharge hopper, and which fan 35 is vented to atmosphere, as best seen in FIG. 4. In this phase, damper 39 seals conduit 32 from inlet 38. De-stoning occurs as the cooled coffee beans are aspirated from the cooling chamber 30A to the discharge hopper 36.

The roasted coffee beans loaded into the discharge hopper 36 may be withdrawn as desired through a controlled discharge port 37.

It will be understood that suitable controls may be provided to actuate the component parts in a predetermined sequence so that the entire roasting operation may be automatically accomplished.

From the foregoing, it will be apparent that the roasting gases are permitted to be vented to atmosphere free of any residual matter such as coffee bean chaff, and/or other impurities commonly associated with the roasting of coffee beans.

While the present invention has been described with respect to a particular apparatus and method, variations and modifications thereof may be made without departing from the spirit and scope of this invention.

What is claimed is:

1. A coffee roasting apparatus comprising:
    a combustion chamber,
    a burner for generating heating gases within said combustion chamber,
    spaced apart baffles disposed within said combustion chamber to define a sinuous recirculation gas path,
    a gas inlet and a gas outlet connected to said combustion chamber,
    a roasting oven,
    means for directing unroasted coffee beans to said roasting oven wherein the beans are roasted,
    a duct connecting said combustion chamber in communication with said roasting oven for directing heating gases from said combustion chamber to said roasting oven,
    said roasting oven including a perforated rotating drum,
    a separator,
    conduit means for directing the heating gases in said roasting oven and entrained coffee chaff exiting said roasting oven during the roasting cycle to said separator wherein said chaff is separated from the heating gases,
    means for directing said heating gases free of any chaff from said separator back to said combustion chamber for exhausting through said gas outlet to atmosphere free of any coffee chaff,
    a cooling chamber for receiving the coffee beans when roasting of the coffee beans has ended,
    a first phase cooling means connected to said conduit means and said cooling chamber for drawing a first phase cooling gas through said cooling chamber for recirculating said first phase cooling gas to said sinuous gas path in said combustion chamber for reheating said first phase cooling gas to roasting temperature,
    and a second phase cooling means connected to said cooling chamber for drawing a second phase cooling gas through said cooling chamber and means for venting said second phase cooling gas directly to atmosphere free of any coffee chaff.

2. A coffee roasting apparatus comprising;
    a combustion chamber,
    a burner for generating combustion gases within said combustion chamber,
    said combustion chamber having a recirculating gas inlet and gas outlet exhausting to atmosphere,
    baffle means disposed within said combustion chamber to define a sinuous flow path,
    a coffee roasting oven for receiving coffee beans to be roasted therein,
    a connecting conduit connecting said combustion chamber in communication with said coffee roasting oven,
    a modulating damper disposed in said connecting conduit,
    said roasting oven including a rotating drum and a gas outlet,
    a first phase cooling means including a suction fan having an inlet connected in communication with said oven gas outlet,
    said suction fan having an outlet,
    a separator, a conduit connecting said outlet of said suction fan in communication with said separator, said separator separating any coffee chaff entrained in the heating gases being recirculated, and means for directing the heating gases exiting said separator back to said combustion chamber for venting to atmosphere free of any coffee chaff, and a cooling chamber for receiving the coffee beans roasted in said oven upon completion of the roasting period, means for connecting said suction fan in communication with said cooling chamber for drawing cooling air into said cooling chamber and closing said suction fan out of communication with said oven, whereby said suction fan effects recirculation of said cooling air to said combustion chamber, said cooling air being reheated to roasting temperature in said roasting oven as said cooling air flows through said sinuous path, and a second phase cooling means connected to said cooling chamber for drawing a second phase cooling air through said cooling chamber, and means for venting said second phase cooling air directly to atmosphere free of any coffee chaff.

3. A coffee bean roasting apparatus having a coffee roasting cycle and a coffee cooling cycle comprising;

a combustion chamber including a burner for generating heating gases, a roasting oven for receiving coffee beans to be roasted therein, said roasting oven being connected in communication with said combustion chamber whereby heating gases generated by said burner are directed to said roasting oven, said combustion chamber including an outer housing and spaced baffles disposed within and adjacent said outer housing to define a sinuous gas flow path, a gas inlet in communication with said sinuous gas flow path and a gas outlet connected to said combustion chamber, means for recirculating the heating gases flowing through said roasting oven back to said combustion chamber free of any coffee bean residue, a cooling chamber disposed adjacent said roasting oven for cooling the coffee beans after being roasted in said oven, said recirculating means including a suction fan, said suction fan having a fan inlet and a fan outlet, conduit means connecting said fan inlet in communication with said roasting oven and with said cooling chamber, said conduit means including means for selectively placing said fan inlet in communication with said roasting oven during the roasting cycle and with said cooling chamber during a cooling cycle, a separator connected in communication with said fan outlet downstreamwise of said fan outlet, said separator having a separator outlet connected in communication with said combustion chamber inlet, whereby said suction fan effects recirculation of said heating gases from said roasting oven to said separator for separating any coffee bean residue therein from the heating gas recirculating back to the combustion chamber to be exhausted to atmosphere free of any coffee bean residue during the roasting of the coffee beans, said suction fan also drawing a first cooling medium through said cooling chamber and means for recirculating said first cooling medium back to the combustion chamber whereby said first cooling medium is incrementally reheated to roasting temperature as said first cooling flows through said sinuous gas path, and including a secondary cooling means for effecting a secondary cooling of said roasted coffee beans within said cooling chamber, said secondary cooling means including a second suction fan having an inlet and outlet, a secondary cooling conduit connecting said inlet of said second fan to said cooling chamber, and means within said secondary cooling conduit for selectively connecting said inlet of said second fan into and out of communication with said cooling chamber for selectively directing a secondary cooling medium through said cooling chamber to further cool the roasted coffee beans therein whereby the secondary cooling medium is exhausted directly to atmosphere through said outlet of said second fan free of any coffee bean residue.

4. A coffee roasting apparatus as defined in claim 3 and including means for de-stoning said roasted coffee beans subsequent to the cooling thereof.

5. A coffee roasting apparatus as defined in claim 3 and including:

means for aspirating the cooled coffee beans from said cooling chamber when cooled, and a discharge hopper connected with said cooling chamber for receiving said aspirated coffee beans subsequent to the cooling thereof, and means connected between said cooling chamber and said discharge hopper whereby the aspirated coffee beans are de-stoned.

6. A coffee bean roasting apparatus as defined in claim 3 and including means for de-stoning said coffee beans upon completion of said secondary cooling.

* * * * *